United States Patent [19]

Sasaki et al.

[11] 4,279,006
[45] Jul. 14, 1981

[54] MAGNETIC TAPE RECORDING AND/OR REPRODUCING APPARATUS

[75] Inventors: Toshiharu Sasaki, Kawanishi; Noboru Katakabe, Katano; Yoshihiro Yokoyama, Kobe, all of Japan

[73] Assignee: Matsushita Electric Industrial Co., Ltd., Kadoma, Japan

[21] Appl. No.: 30,879

[22] Filed: Apr. 17, 1979

[30] Foreign Application Priority Data

Apr. 21, 1978 [JP] Japan .................................. 53/47981
Apr. 21, 1978 [JP] Japan .................................. 53/47983

[51] Int. Cl.³ .................... G11B 15/24; G11B 15/28; G11B 5/54
[52] U.S. Cl. .................... 360/90; 242/203; 360/74.1; 360/105
[58] Field of Search .................. 360/90, 83, 69, 71, 360/74.1, 74.3, 105, 74.2; 242/203, 206–210, 201–202; 226/49–51

[56] References Cited

U.S. PATENT DOCUMENTS

| | | | |
|---|---|---|---|
| 2,741,439 | 4/1956 | Dale et al. ............................. | 242/203 |
| 3,393,277 | 7/1968 | Nettleton et al. ...................... | 360/90 |
| 3,470,382 | 9/1969 | Tobey .................................... | 360/90 |
| 3,533,633 | 10/1970 | Wilder .................................. | 360/74.1 |
| 3,586,259 | 6/1971 | Richt .................................... | 242/203 |

Primary Examiner—Alfred H. Eddleman
Attorney, Agent, or Firm—Wenderoth, Lind & Ponack

[57] ABSTRACT

A magnetic tape recording and/or reproducing apparatus which has a magnetic head, two tape winding reels, a first capstan and a first pressure roller opposed thereto, a second capstan and a second pressure roller opposed thereto, the pressure rollers being movable into contact with the capstans for transporting a magnetic tape. Two fixed motors are coaxial with and directly drive the respective capstans. A tape direction control is connected to the pressure rollers for selectively bring the first or second pressure roller into contact with the first or second capstan, respectively for selectively driving the tape in one or the other direction. A transmission is provided to which the tape direction control is connected for driving the tape winding reels under the control of the tape direction control means. The transmission has idlers for transmitting the rotary motion of the motors and is selectively engageable with one of the two winding reels and one of the two motors or with the other of the two winding reels and the other of the two motors, depending on the direction in which the tape is to be transported.

9 Claims, 12 Drawing Figures

MAGNETIC TAPE RECORDING AND/OR REPRODUCING APPARATUS

This invention relates to a magnetic tape recording and/or reproducing apparatus and, more especially, to a bi-directional magnetic tape recording and/or reproducing apparatus. In general, a bi-directional magnetic tape playing apparatus comprises a motor for driving a magnetic tape, a magnetic head, two sets of capstans and pressure rollers on both sides of the magnetic head, and two reel drive means. Typically, each of the capstans is coupled to a flywheel and a rubber belt is provided for connecting the motor with the respective flywheels so that the motor drives the respective capstans in opposite directions. The direction of magnetic tape movement depends upon of the pressure rollers selectively contacts the corresponding capstan. That is to say, a magnetic tape is moved from the head portion to the right when the pressure roller disposed at the right side of the magnetic head is in contact with the capstan disposed at the right side of the magnetic head. On the other hand, when the pressure roller disposed at the left side of the magnetic head is in contact with the capstan disposed at the left side of the magnetic head, the tape is moved to the left.

Typical apparatus is provided with a right idler pulley and a left idler pulley. When the right capstan drives the magnetic tape to the right, the right idler pulley engages the right capstan with the right reel drive means for winding the magnetic tape driven by the right capstan onto a right reel, and when the left capstan drives the magnetic tape to the left, the right idler pulley is released from engagement. Conversely, the left idler pulley engages the left capstan with the left reel drive means when the left capstan drives a magnetic tape to the left, and it is released from engagement when the right capstan drives the magnetic tape to the right.

In general, each of the reel drive means is provided with a slip clutch means for taking up the magnetic tape with a substantially constant tape tension independent of the rotational speed of the take-up reel.

Such a prior art apparatus as described above has many problems as follows. It is very difficult to transport a tape accurately at a constant speed, because the load fluctuation due to the idler pulley, the rubber belt, and a slip clutch means is directly transmitted to the capstan which is driving a tape. Further, since the two capstans are connected to each other with a rubber belt, respective capstans affect each other. Consequently it is impossible to rotate the respective capstans independently with high accuracy.

Furthermore, the hardness of the rubber belt varies depending upon the ambient temperature, and the life of the rubber belt is short. Further, it is difficult to assure and maintain a high performance standard for a long time, because the slip clutch means is apt to fluctuate the take-up tape tension and has a short useful life.

It is quite difficult to overcome the problems described above especially in a compact size tape player utilizing a compact cassette tape as it is called, more especially for car stereo.

It is therefore the main object of the present invention to provide a bi-directional magnetic tape recording and/or reproducing apparatus which overcomes above mentioned disadvantages and has high performance characteristics.

Another object of the present invention is to provide a bi-directional magnetic tape recording and/or reproducing apparatus which makes possible reliable and precise tape transportation under various conditions.

Further object of the present invention is to provide a bi-directional magnetic tape recording and/or reproducing apparatus which has a simple construction.

These objects are achieved by providing a bi-directional magnetic tape recording and/or reproducing apparatus according to the present invention which comprises a magnetic head, one set of capstan and pressure roller means for driving a magnetic tape in one direction, another set of capstan and pressure roller means for driving a magnetic tape in the opposite direction, two motors for driving the respective capstans independently of each other, two reel drive means for winding or unwinding a magnetic tape onto respective reels, a tape direction control means for changing the direction of tape movement by selectively bringing the respective pressure rollers into contact with the respectively corresponding capstans, and a transmission means for selectively engaging the respective motors with the respective reel drive means, so that the motor coupled to the capstan which is in contact with the pressure roller and driving the magnetic tape drives that capstan only, and the other motor coupled to the other capstan which is not in contact with the other pressure roller drives the take-up reel drive means.

Further objects and advantages will become apparent from the following detailed description considered in connection with the accompanying drawings, in which.

Figure 1:
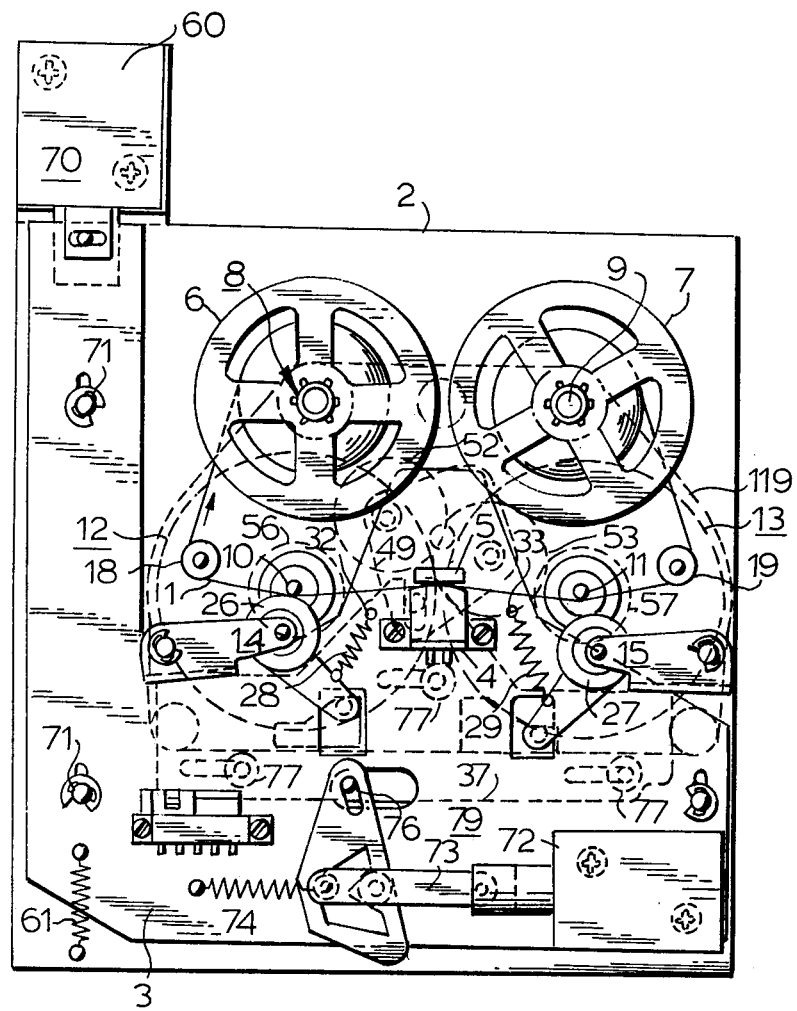
FIG. 1 is a schematic top plan view of an example of a magnetic tape recording and/or reproducing apparatus according to the present invention.

Referring now to the drawings, there will be explained an embodiment of a magnetic tape recording and/or reproducing apparatus according to the present invention.

Referring to FIG. 1, reference numeral 1 designates a magnetic tape. Numerals 10 and 11 designate first and second capstans rotatably mounted on a chassis 2 for driving the tape 1 at a predetermined constant speed. Numeral 4 designates a magnetic head mounted on a head carriage 3 which is slidably mounted on the chassis 2. Numeral 5 designates a pad made of a material such as felt for causing the tape 1 to contact with the head 4 steadily. Numerals 6 and 7 designate reel hubs for winding or unwinding the tape 1 thereon. Numerals 8 and 9 designate first and second reel drive means rotatably mounted on a stator plate 119 which is mounted on the under side of the chassis 2 for holding and driving the reel hubs 6 and 7. On both sides of the head 4, first and second pressure roller means 14 and 15 are respectively pivotally mounted on respective shafts 20 and 21 respectively fixed on the chassis 2 to move the tape 1 in cooperation with respective corresponding capstans 10 and 11. The head carriage 3 is slidably mounted on the chassis 2 held on and guided by guide pins 71 to move the head 4 between the operative position shown in FIG. 1, FIG. 2 and FIG. 3 and the inoperative position shown in FIG. 4. A solenoid 60 mounted on the chassis 2, and a spring 61 connected between the chassis 2 and the head carriage 3 constitute a head carriage actuating means 70 for moving the head carriage 3. First and second pressure roller means 14 and 15 are respectively urged toward the respective corresponding first and second capstans 10 and 11 by respective springs 28 and 29 respectively connected between respective pressure roller support arms 22 and 23 and respective pins 32 and 33 respectively fixed on the head carriage 3. On the other hand, a direction control plate 37 is slidably disposed under the head carriage 3 held on and guided by guide pins 76 fixed on the under side of the head carriage 3, and it selectively keeps one of the respective pressure rollers 26 and 27 of the respective pressure roller means 14 and 15 away from the respective corresponding capstans against the force of the respective corresponding springs.

Figure 2:
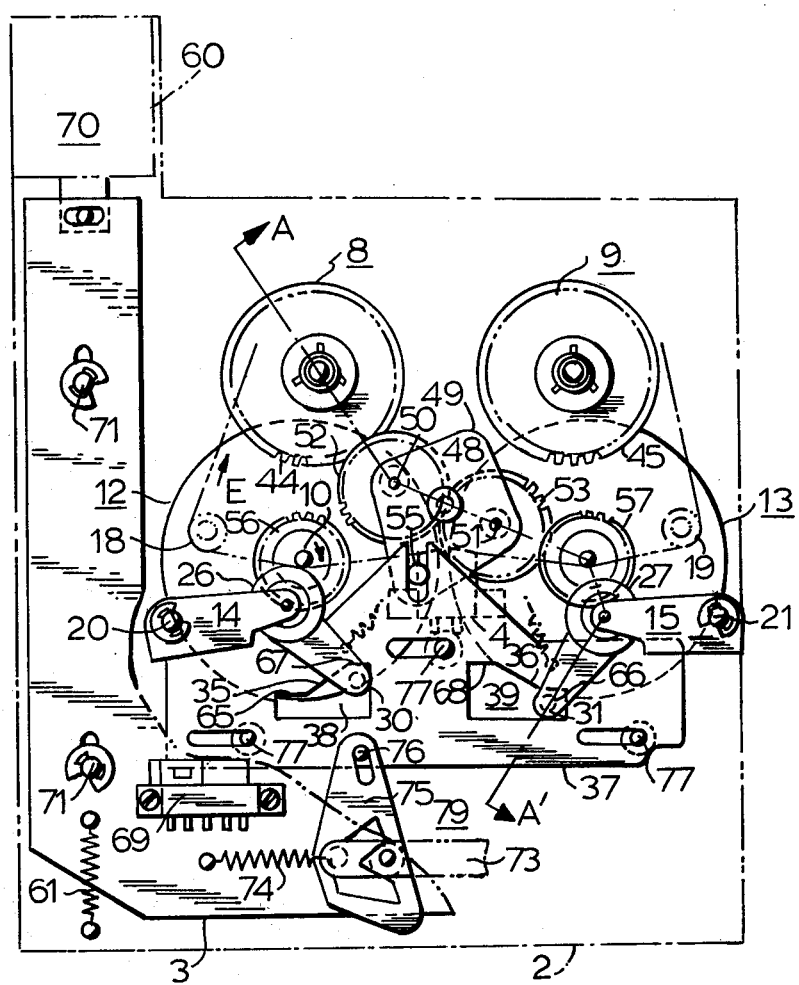
FIG. 2 is a schematic top plan view, partially cut away, of the apparatus of FIG. 1 which is in a tape playing state for moving the tape in one direction.
Figure 3:
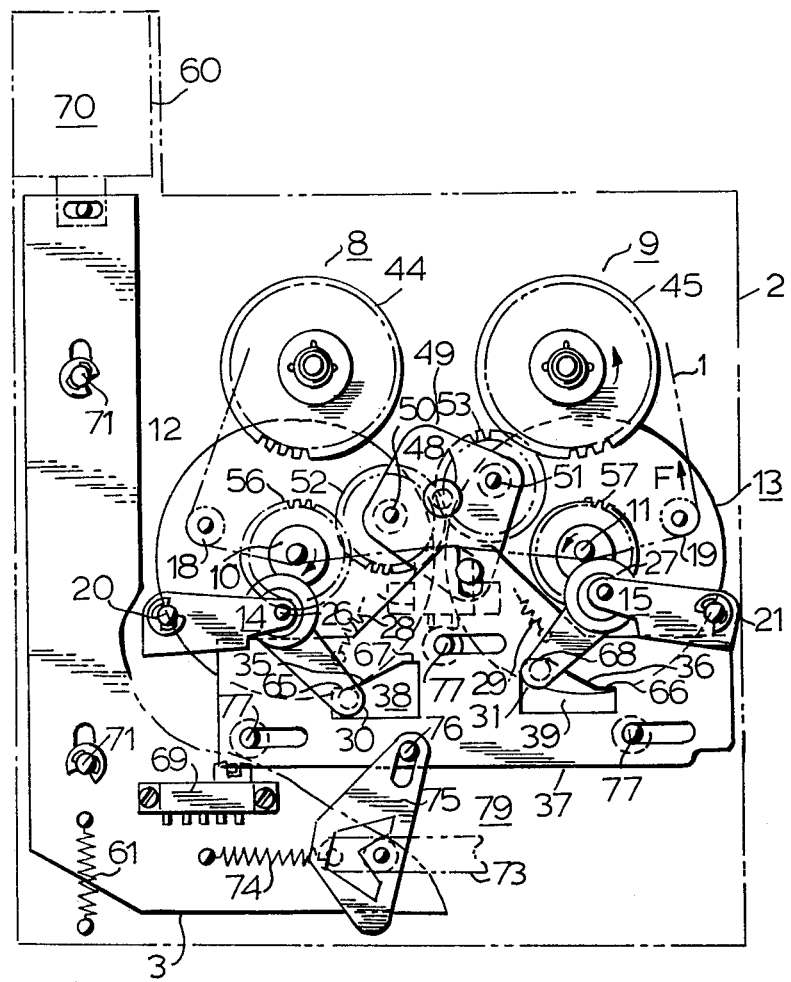
FIG. 3 is a schematic top plan view, partially cut away, of the apparatus of FIG. 1 which is in a tape playing state for moving the tape in the opposite direction to the of FIG. 1.

An actuating means 79 consisting of a solenoid 72, an arm 73, a spring 74 and a swing lever 75 which is engaged with a pin 76 fixed on the direction control plate 37 is provided on the head carriage 3 for moving the direction control plate 37 to the right or to the left alternately between the position shown in FIG. 2 and the position shown in FIG. 3 in a well known manner at every energization of the solenoid 72.

Furthermore, mounted on the head carriage 3 is a switch 69 to control a control circuit means for the first and second motors in response to the movement of the direction control plate 37. Numerals 18 and 19 designate guide rollers rotatably mounted on the chassis 2 for assuring the tape movement.

Figure 5:
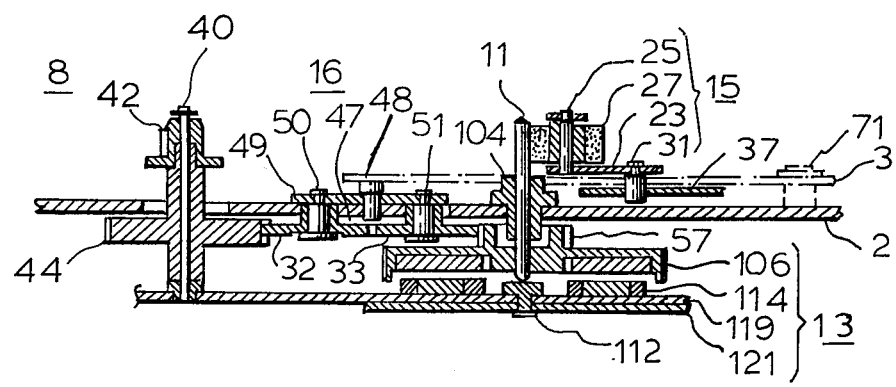
FIG. 5 is a vertical sectional view of the apparatus of FIG. 1 taken along line A–A' of FIG. 2.
Figure 8:
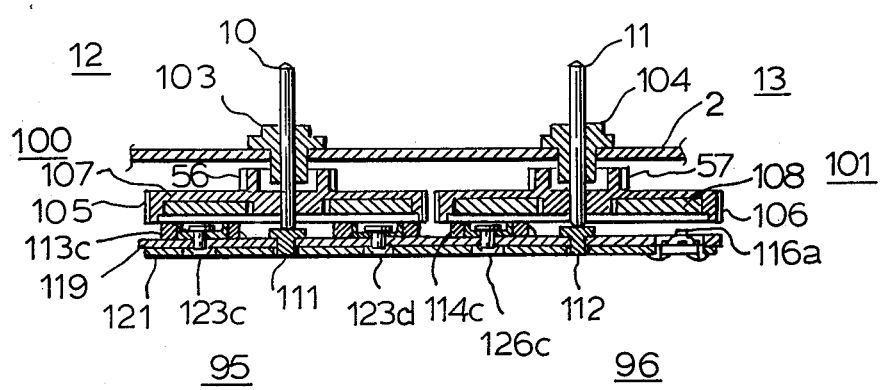
FIG. 8 is a vertical sectional view of the motors taken along line B–B' of FIG. 2.

As shown in FIG. 5, and FIG. 8, the first and second capstans 10 and 11 are coupled to the first and second rotors 105 and 106 respectively and serve as respective drive shafts of the first and second motors 12 and 13 respectively. The rotors 105 and 106 are rotatably supported by respective radial bearings 103 and 104 respectively fixed on the chassis 2 and respective thrust bearings 111 and 112 respectively disposed on the stator plate 119. Respective top portions of the rotors 105 and 106 are respectively provided with gear wheels 56 and 57 for engaging with respective idler gears 52, 53 to be described later.

Figure 6:
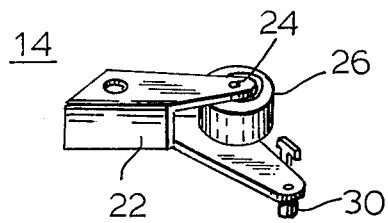
FIG. 6 is a perspective view of a pressure roller means of the apparatus of FIG. 1.

Referring to FIG. 6, the first pressure roller means 14 has a first pressure roller support arm 22 pivotally supported on a shaft 20 fixed on the chassis 2 and first pressure roller 26 rotatably supported on a shaft 24 fixed on the first pressure roller support arm 22 which serves to move a tape in cooperation with the first capstan 10. One portion of the arm 22 extends parallel to the head carriage 3, and at the end of the portion of the arm 22, a pin 30 is fixed. The pin 30 extends through an opening 38 formed in the direction control plate 37 to permit the contact with the edges defining the opening 38 in the direction control plate 37. Second pressure roller means 15 is constructed in the same manner as the first pressure roller means 14 described above. Therefore, although the construction of the second pressure roller means will not be explained here, it will easily be understood.

Figure 4:
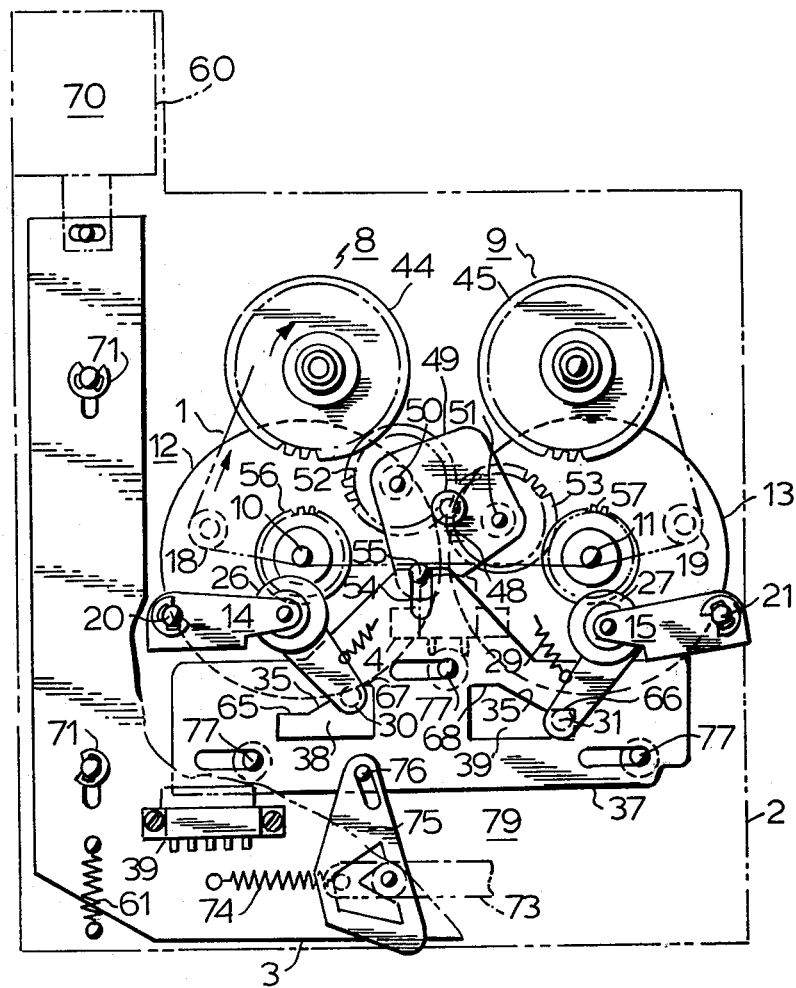
FIG. 4 is a schematic top plan view, partially cut away, of the apparatus of FIG. 1 which is in a fast-winding state in one direction.

As shown in FIGS. 4 and 5, the first and second reel drive means 8 and 9 are provided respectively with reel disc means 44 and 45 which respectively form respective gear wheels for engaging with the respective idler gears 52 and 53 to be described later, and coupling portions 42 and 43 for holding the reel hubs 6 and 7 respectively, and are respectively rotatably supported on respective reel shafts 40 and 41 fixed on the stator plate 119 respectively.

The transmission means 16 consists of a mounting plate 49 pivotably mounted on the chassis 2 pivoted by pivot pin 48 fixed on the mounting plate 49 and engaged in a hole 47 formed in the chassis 2, and idler gears 52 and 53 for transmitting the rotational movement of the motor 12 or 13 to the reel drive means 8 or 9. The respective idler gears 52 and 53 are rotatably supported on respective shafts 50 and 51 respectively fixed on the under side of the mounting plate 49 and mesh with each other. The idler gears 52 and 53, the gear wheels 56 and 57 and the reel disc means 44 and 45 are all in the same plane for meshing engagement, and the pivot pin 48 is disposed in the plane of symmetry both between the rotational axes of the first and second reel drive means 8 and 9 and between the first and second capstans 10 and 11. A U-shaped recess 54 is formed in the direction control plate 37 and through it extends a coupling pin 55 fixed on the plate 49. Consequently, the mounting plate 49 is swung in response to the sliding movement of the direction control plate 37.

FIG. 2 shows the state in which the tape 1 is being driven to the left (in the direction shown by arrow E) and the magnetic head 4 is in contact with the tape 1 and operating. In this state (as illustrated in FIG. 2), the direction control plate 37 is at the left end position shown in FIG. 2, and therefore the pin 30 on the first pressure roller means 14 is spaced from the plain edge portion 67 forming the opening 38, and the pressure roller 26 is in pressure contact with the first capstan 10 because the direction control plate 37 will not block the urging action of the first pressure roller means 14. On the other hand, the direction control plate 37 keeps the second pressure roller 27 slightly away from the second capstan 11 against the force of spring 29, because the plain edge portion 66 forming the opening 39 is in contact with the pin 31 of the second pressure roller means 15 and urges it counterclockwise in FIG. 2.

The idle gear 53 engages with the gear wheel 57 of the second motor 13, and the idler gear 52 engages with the first reel disc means 44. In the state described above, the first motor 12 rotates clockwise at a predetermined constant speed and the second motor 13 rotates counterclockwise. Consequently, the tape is transported to the left at a constant speed and the head 4 operates for recording or reproducing. Furthermore, the first reel drive means 8 is driven clockwise by the second motor 13 through the idler gears 52 and 53 to wind up the tape transported by the first capstan 10 and the first pressure roller 26 onto the reel hub 6. The rotational speed of the second motor 13 is thus controlled depending upon the tape running speed, the diameter of the tape wound on the reel hub 6 and the gear ratio between the reel disc means 44 and the gear wheel 57. Because the second reel drive means 9 is freed from the idler gear 52 or 53, it is rotated clockwise by the tape tension caused by rotational cooperation of the first capstan 10 and first pressure roller 26 to supply the tape 1 from the reel hub 7.

Now referring to FIG. 2 and FIG. 3, the operation in changing from the state shown in FIG. 2 to the state shown in FIG. 3 will be explained. Energization of the solenoid 72 actuates the actuating means 79. As a result, the direction control plate 37 is displaced from the left end position shown in FIG. 2 to the right end position shown in FIG. 3 and stopped there. Until another energization of the solenoid 72, the direction control plate 37 remains at this position. In response to the movement of the direction control plate 37, the mounting plate 49 is swung from the position shown in FIG. 2 to the position shown in FIG. 3, and therefore, the idler gears 52 and 53 are released from meshing engagement with the gear wheel 57 and the reel disk means 44, and then the idler gear 52 engages with the gear wheel 56, the idler gear 53 engages with the reel disc means 45. Further, in response to the movement of the direction control plate 37, the first pressure roller 26 is displaced from the operative position shown in FIG. 2 to the inoperative position shown in FIG. 3 where it is spaced from the first capstan 10, as the pin 30 is lifted up along the sloping edge portion 35 and contacts the plane edge portion 65, and contrarily, the second pressure roller 27 is displaced from the inoperative position to the operative position where it is in contact with the second capstan 11 as the pin 31 is brought down along the sloping edge portion 36 and is freed from the direction control plate 37. Further, the movement of the direction control plate 37 actuates the switch 69 to change switching contactors of the control circuit means 200 of the motors 12 and 13 as described later.

Consequently, in the state shown in FIG. 3, the second motor 13 and the second capstan 11 rotates counterclockwise at a predetermined constant speed and drives the tape 1 to the right (in the direction shown by arrow F) at a constant speed in cooperation with the second pressure roller 27. The first motor 12 rotates clockwise and drives the second reel drive means 9 counterclockwise through the idler gears 52 and 53 to take up the tape transported by the second capstan 11 and the second pressure roller 27 onto the reel hub 7. The rotational speed of the first motor 12 is thus controlled depending upon the tape running speed, the diameter of the tape wound on the reel hub 7 and the gear ratio between the reel disc means 45 and the gear wheel 56. Because the first reel means 8 is released from meshing engagement with the idler gear 52, it is rotated counterclockwise by tape tension caused by rotational cooperation of the second capstan and the second pressure roller 27 to supply the tape from the reel hub 6. The head 4 is in the operative position just as in the case of FIG. 2 and is operating (recording or reproducing).

Referring to FIG. 4, mode changing operation and the condition of the apparatus in the "fast winding mode" will be described.

De-energization of the solenoid 60 changes the state from the state shown in FIG. 2 to the state shown in FIG. 4. Upon de-energizing the solenoid 60, the head carriage 3 is urged downward in FIG. 4 and kept at the position shown in FIG. 4. Therefore, the head 4 is also moved downward to the inoperative position where the head 4 is spaced from the tape 1. And also, the first pressure roller means 14 is swung clockwise and the pressure roller 26 is moved out of contact with the first capstan 10.

Because the actuating means 79 is not actuated, the idler gears 52 and 53 remain at the state shown in FIG. 2.

In this state (shown in FIG. 4), the second motor 13 is accelerated automatically counterclockwise by a control circuit means (to be described later) and drives the first reel drive means 8 rapidly through the idler gears 53 and 52. Therefore the tape 1 is wound rapidly on to the reel hub 6.

When it is desired to wind the tape 1 onto the reel hub 7 rapidly, in the state shown in FIG. 4 the actuating means 79 is actuated and moves the direction control plate 37 from the left end position shown in FIG. 4 to the right end position and actuates the switch 69. As a result, the first motor 12 is accelerated clockwise and the idler gears 52 and 53 engage the gear wheel 56 with the reel disc means 45 in the same manner as described above. Therefore, the reel drive means 9 is rotated counterclockwise and the tape is wound rapidly onto the reel hub 7.

A change from a fast-winding mode illustrated in FIG. 4 to a tape-playing mode illustrated in FIG. 2 is accomplished by energigation of the solenoid 60 which moves the head 4 toward the tape 1 and into contact with it. The change from the other tape-playing mode illustrated in FIG. 3 to the fast-winding mode illustrated in FIG. 4 is accomplished by de-energization of the solenoid 60 and simultaneous enegization of the solenoid 72 which moves the direction control plate 37 and the idler gears 52 and 53. A change contrary to the motion described above and any other changing motion can easily be understood. From the explanation described above, following advantages of the present invention will become clear.

In the preferred embodiment of the present invention, it is possible to change the running direction of the tape easily by simply reciprocating the direction control plate 37 during the playing mode (recording or reproducing) and also during the fast-winding mode. The motor coupled to the capstan which is in contact with a pressure roller and driving the tape drives the capstan only and is free from that reel drive means 8 and 9, the idler gears 52 and 53, and the other motor, and therefore that capstan can drive the tape very accurately at a constant speed.

As the capstans 10 and 11 are respectively fixed on the respective motors 12 and 13, the rotational movements of the motors 12 and 13 are perfectly transmitted. Consequently, the problems caused by the use of a rubber belt as described before will be overcome. That is to say, it is possible to maintain a high performance of the apparatus in any environment.

The reel drive means which serves to wind the tape is engaged with and driven by the other motor which drives the other capstan that is not in contact with the other pressure roller, and the rotational speed of said other motor is inevitably controlled in response to the diameter of the tape wound on the reel hub which is taking up the tape. Therefore, it is not necessary to provide slip clutch means on the reel drive means 8 and 9, and the problems in the prior art described before and due to the use of the slip clutch means will be overcome. Since a power of a motor is transmitted to a reel drive means by two idler gears 52 and 53, it is not necessary to change the rotational direction of the motor in either mode. That is to say, the first motor 12 rotates clockwise both when it drives the second reel drive means 9 and when it drives the first capstan 10 only. The second motor 13 rotates counterclockwise both when it drives the second capstan 11 only and when it drives the first reel drive means 8. Therefore, the control circuit for the motors is greatly simplified. Besides, idler pulleys the peripheral surface of which is formed of flexible materials such as rubber can be used for idler gears 52 and 53. But in such a case, at the time of stopping the operation of the apparatus, each of said idler pulleys has to be moved out of contact with other pulleys for avoiding a permanent distortion of the peripheral surface. On the other hand, when idler gears are adopted, the gears are never distorted. Thus, the idler gears 52 and 53, idler gears 52 and 53 and gears 56 and 57, and idler gears 52 and 53 and reel discs 44 and 45 can be kept engaged with each other even in the non-operative state of the apparatus. Therefore the idler gears 52 and 53 can be rotatably mounted on only a single plate 49. And further, because the pivot pin 48 is disposed in the plane of symmetry both between the rotational axis of the first and second reel drive means 8 and 9 and between the first and second capstans 10 and 11, the changing motion of the engagement is easily accomplished by simple swing motion of the mounting plate 49.

Further in this apparatus, because the speeds of the motors are changeable, the transmission of the driving power from one of the motors to the corresponding reel drive means during the fast-winding mode and that during the playing mode are both accomplished by the same idler gears 52 and 53. Therefore the construction of this apparatus is very simple.

In the case when a cassette tape, as it is called, which receives a pad, guide rollers and reel hubs in a cassette is used, it is obvions that the apparatus does not need the pad 5, the guide rollers 18 and 19, and the reel hubs 6 and 7. On the head carriage 3, an erasing head may be provided.

Referring now to FIGS. 7, 8, 9, and 10, the first and second motors 12 and 13 will be fully described hereinafter. The first and second motors 12 and 13 are similarly constructed and consist respectvely of the first and second capstans 10 and 11, first and second rotor means 100 and 101 respectively coupled to the capstans 10 and 11, first and second stator means 95 and 96 for respectively driving the respective rotor means and first and second speed detecting means 117 and 118 for respectively detecting the rotational speed of the rotor means 100 and 101. The respective rotor means 100 and 101 are respectively formed of cylindrical first and second rotors 105 and 106 which are coaxally fixed to the respective capstans 10 and 11 and ring-shaped first and second magnets 107 and 108 which are coaxally fixed to the respective rotors 105 and 106 respectively and have three pairs of magnetic poles respectively.

First and second stator means 95 and 96 are respectively formed of first and second armature coil assemblies 113 and 114 facing the respective magnets 107 and 108 respectively, first and second switching means 115 and 116 for controlling the respective currents through the respective armature coil assemblies 113 and 114, and a stator plate 119 which supports the respective armature coil assemblies 113 and 114 and the respective switching means 115 and 116 and is facing and spaced from the respective magnets 107, 108.

The first and second rotor means 100 and 101 are respectively rotatably supported by respective radial bearings 103 and 104 respectively fixed on the chassis 2 and respective thrust bearings 111 and 112 respectively mounted on the stator plate 119. The top portions of the respective rotors 105 and 106 have the forms of respective gear wheels 56 and 57 for being engaged with the idler gear 52 or 53. The respective switching means 115 and 116 consist respectively of respective Hall elements 115a and 115b, and 116a and 116b which detect the respective positions of the respective magnets 107 and 108 relative to the respective armature coil assemblies 113 and 114 to control the electric circuit of the respective motors for continuously rotating the respective rotor means. The stator plate 119 is common to the respective stator means 95 and 96 and is secured on plural stays fixed on the chassis 2.

A printed-circuit board 121 is fixed on the side of the stator plate 119 which is opposite to the side where the respective armature coil assemblies are fixed, and the terminals of the respective armature coils are soldered on it. The stator plate 119 is made of a soft magnetic material which has high permeability. And it is obvious that the stator plate 119 may be divided into two pieces for forming the first and second stator means which are independent of each other.

Each of the armature coils of said respective armature coil assemblys 113 and 114 is in the form of a trapezoid, and each of said armature coil assemblies 113 and 114 is formed similar to the other. Generally, the number of the armature coils of the armature coil assemblies 113 and 114 will be in accordance with the number of magnetic poles of each magnet and the driving system of each motor. In the respective motors of this embodiment of the present invention, the respective magnets 107 and 108 have 3 pairs of poles respectively and the respective armature coil assemblies 113 and 114 are respectively formed of 4 armature coils. The armature coil 113a is formed of a leading wire wound in a plurality of turns around a coil bobbin 125a which is fixed on the stator plate 119 with a caulking pin 123a. The other armature coils 113b, 113c and 113d and 114a, 114b, 114c and 114d are respectively formed in the same manner as the armature coil 113a.

Figure 7:
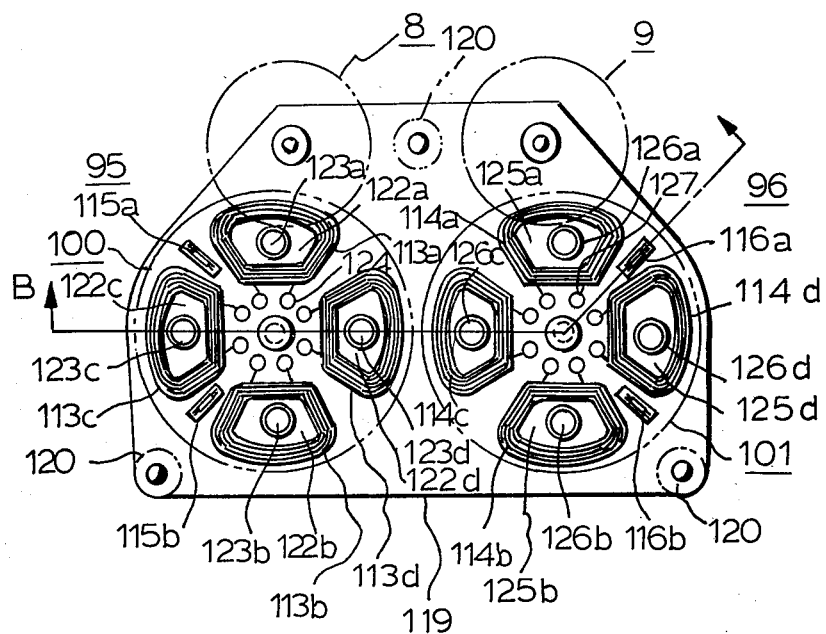
FIG. 7 is a top plan view of first and second motors (rotor means not shown) constituting the apparatus of FIG. 1.

Respective armature coils are equidistantly disposed on the stator plate 119 around respective rotational axes of the respective rotors as shown in FIG. 7. Respective terminals of the respective leading wires are soldered and connected with the printed-circuit board 121 through respective holes 124 formed in the stator plate 119. The respective armature coils 113a, 113b, 113c and 113d and 114a, 114b, 114c and 114d are connected in the manner shown in FIG. 11. It is not necessary that respective armature coils have trapezoidal forms. But the trapezoidal form is effective for the purpose of minimizing torque ripple of the respective motors.

Each of the first and second switching means 115 and 116 serves as a commutator provided in a conventional motor. Therefore, the respective switching means have to detect the positional relation between the respective magnets and the respective armature coil assemblies. For this purpose, the respective switching means 115 and 116 are respectively provided with two Hall elements 115a and 115b and 116a and 116b which produce voltages corresponding to the magnets facing thereto, and control the currents to the armature coil assemblies in response to the produced voltages. The respective Hall elements are respectively disposed facing and spaced from the respective magnets, and each the Hall elements of each pair are disposed at positions 90° around the rotational axis with a coil being positioned on a 45° central line between the Hall elements of each pair. The leads of the respective Hall elements are soldered on and connected with the printed-circuit board 121. Although Hall elements have shown and described, the present invention does not always need the Hall elements.

Figure 9:
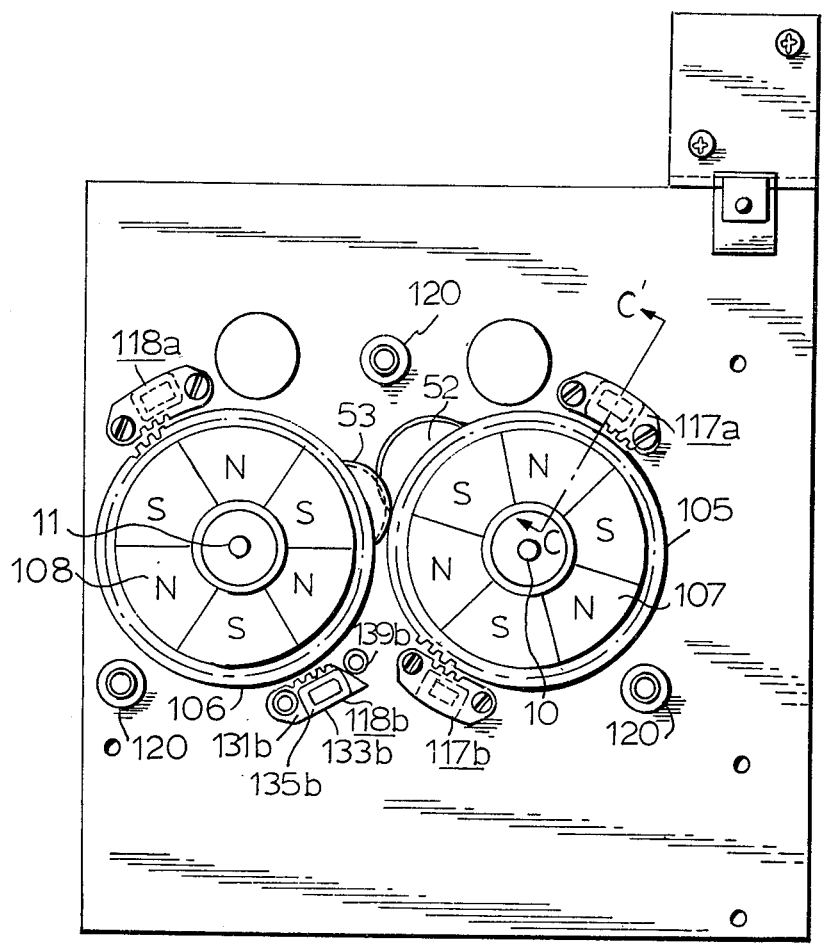
FIG. 9 is a bottom plan view of the apparatus of FIG. 1 (stator means of the motors being moved)
Figure 10:
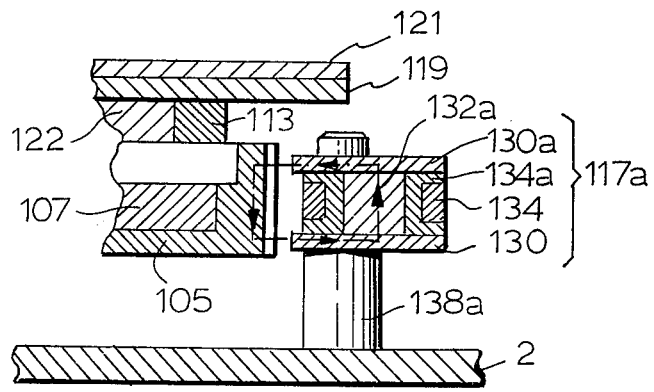
FIG. 10 is a fragmentary sectional view taken along line C–C' of FIG. 9.

Referring to FIGS. 9 and 10, the speed detecting means 117 and 118 will be described hereinafter.

FIG. 9 is a bottom plan view of this apparatus which shows respective speed detecting means 117 and 118 for detecting the respective rotational speeds of the respective rotors 105 and 106. In FIG. 9, the respective stator means 95 and 96 are removed. The respective peripheral surfaces of the first and second rotors are formed with regular convex and concave portions at a constant pitch, and the first and second speed detecting means 117 and 118 consist of respective pairs of frequency generator means 117a and 117b and 118a and 118b which are respectively disposed facing and slightly spaced from the respective rotors. The respective frequency generator means 117a and 117b and 118a and 118b have the same construction. Therefore, means 117a will be described below as a repesentative. The frequency generator means 117a consists of two soft magnetic plates 130a and 130a' which face each other, a magnet 132a disposed between said two plates 130a and 130, and an armature coil 134 wound in a plurality of turns on a bobbin 134a surrounding the magnet 132a. The means 117a is secured on a pair of stays 138a made of nonmagnetic material which is fixed on the chassis 2. The soft magnetic plates 130a and 130 are disposed so that respective edges of the plates 130a and 130 are slightly spaced from the peripheral surface of the rotor 105, each edge having convex and concave portions of the same pitch as that of the convex and concave portions on the rotor 105. The magnet 132a forms a magnwetic circuit (shown by two-dot-dash chain line of FIG. 2) through the soft magnetic plate 130a, the rotor 105, the soft magnetic plate 130 and itself. Flux running through said magnetic circuit vary in response to relation between the positions of the convex and concave portions on rotor 105 and those on soft magnetic plates 130a and 130. That is, when the convex portions on rotor 105 face the convex portions of soft magnetic plates 130a and 130, the flux is maximized. When the concave portions of rotor 105 face the concave portions of soft magnetic plates 130a and 130, the flux is minimized. As a result, the armature coil 134 generates an altenating voltage the frequency of which is in proportion to the rotational speed of the rotor 105. Besides, it is not necessary that both of the soft magnetic plates 130a and 130 have such convex-concave portions. It is enough that only one of the plates 130a and 130 has them. But, for the purpose of increasing the output voltage, both plates should preferably have them. The above-described convex-concave portions at a constant pitch can be provided, in other words, by periodically cut off recesses with equal spaces on the peripheral surfaces.

Either one of the frequency generator means 117a and 117b is enough to generate an output voltage, but it is better to provide two or more frequency generator means for providing a higher output voltage. Furthermore, to provide a plurality of frequency generator means is effective for minimizing a detection error occuring from eccentric movement of the rotor 105. The position of the armature coil 134 need not always be at the place shown in FIGS. 9 and 10. It may be disposed at any place where the flux passes.

Figure 11:
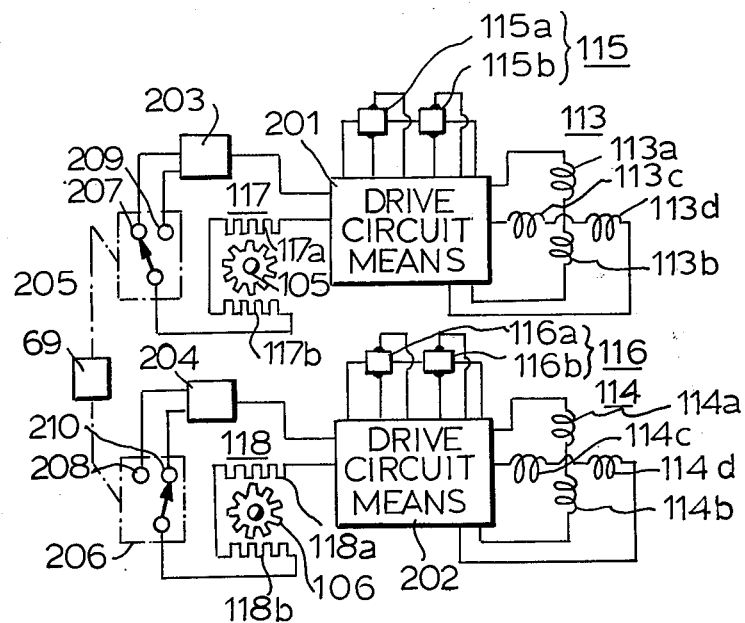
FIG. 11 is a schematic circuit diagram of the first and second motors.

Referring to FIG. 11, a control circuit means 200 for driving and controlling the first and second motors 12 and 13 will be described hereinafter. The control circuit means 200 consists of a pair of circuit means which are similar to each other for driving and controlling the respective motors 12 and 13 respectively. The control circuit means 200 comprises: first and second drive circuit means 201 and 202 for respectively supplying the first and second armature coil assemblys 113 and 114 with power by processing the information from the first and second switching means 115 and 116; the first and second speed control circuit means 203 and 204 for respectively changing and controlling the respective rotational speed of the respective motors 12 and 13 by respectively processing the information from the respective speed detecting means 117 and 118 and switch 69; and first and second switching contacts 205 and 206 which are respectively actuated by the switch 69 (shown in FIGS. 1 to 4) and are respectively connected with the respective speed detecting means 117 and 118.

Contact segments 207 and 208 of the respective switching contacts 205 and 206 are connected to drive the respective motors 12 and 13 respectively at a lower constant speed for tape driving. And the other contact segments 209 and 210 are connected to drive the respective motors 12 and 13 respectively at a higher constant speed for fastwinding. And further, the first and second switching contacts 205 and 206 are so actuated by the switch 69 that one of them is in the state where the contact segment for tape-driving is connected when the other of them is in the state where the contact segment for fast-winding is connected.

The operation of the control circuit means 200 for the first motor 12 will be described briefly hereinafter.

First drive circuit means 201 supplies the armature coils 113a and 113b or 113c and 113d alternately with currents by processing information obtained from the first switching means 115, then the first motor 12 is rotated. Simultaneously, the first speed control circuit means 203 processes information obtained from the first speed detecting means 117 and controls the currents supplied by the first drive circuit means 201 to keep the rotational speed of the first motor 12 constant. The control circuit means for the second motor 13 operates in the same manner as that of the control circuit means for the first motor 12 as described above.

Figure 12:
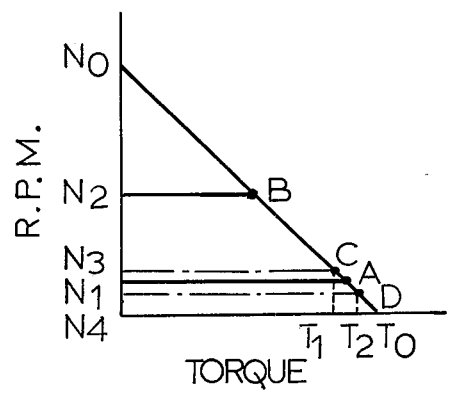
FIG. 12 is a graph which shows a speed-torque curve of the first and second motors.

Next, referring to FIG. 12, rotation control of motor means according to the embodiment of the present invention will be described. The first motor 12 and the second motor 13 are direct-current motors as is apparent from the above description. They have the same motor characteristics. That is, on a graph of speed of rotation N vs. output torque T, the motor characteristics are shown by a straight line connected between no-load speed and starting torque To. FIG. 11 shows the state where the apparatus is in the state of FIG. 2. In this state, the first motor 12 is controlled according to the characteristic curve connecting the low-speed $N_1$, the point A and the starting torque To. On the other hand, the second motor 13 is controlled according to the characteristic curve connecting the high-speed $N_2$, the point B and the starting torque To.

As described above, in FIG. 2, the first pressure roller means 14 is in pressure contact with the first capstan 10. Therefore the tape is transported by the capstan 10 rotating at the rotational speed $N_1$. The rotational speed $N_1$ is determined by the desired transportation speed of the tape and the diameter of the capstan. On the other hand, the second motor 13 driving the reel driving means 8 can be operated on the characteristic curve portion $N_2$-B where the motor is controlled to run at a constant rotational speed $N_2$, but in this case, frictional slip clutch means for the reel driving means is necessary. According to the embodiment of the present invention, no slip clutch means is used for the reel driving means, but the second motor is designed to rotate at a rotational speed between $N_3$ and $N_4$, which speeds are automatically determined by the diameter of the tape roll wound on the first reel driving means 8 and the gear ratio between the first reel disc 44 and the gear wheel 57. That is, the second motor 13 is controlled to rotate at a rotational speed $N_2$, but during actual recording and reproducing when the motor is used as a take-up motor, it is operated on the line C-D. Therefore, as the diameter of the tape roll on the reel hub increases, the rotational speed of the second motor decreases, and accordingly, the motor torque increases from $T_1$ to $T_2$. Thus, the tape tension at the take-up reel can be kept constant.

When the direction control plate 37 is actuated to change the apparatus from state of FIG. 2 to the state of FIG. 3, the switch 69 is switched at the moment when the pressure contact of the pressure roller means and the meshing engagement of the idler gears 52 and 53 are switched. Thus, the first switching contacts 205 and 206 are switched, whereby the first motor becomes controlled to operate along the $N_2$-B-To line, and the second motor becomes controlled to operate along the $N_1$-A-To line. Consequently, the second motor 13 is controlled to rotate at a constant speed along line $N_1$-A to transport the tape 1, while the first motor 12 drives the second reel drive means 9 along the line C-D.

Next, the case when the apparatus is changed from the state of FIG. 2 to the state of FIG. 4, where the tape 1 is fast-forwarded, will be described. When such a change occurs in the embodiment of the present invention, occurs that only occurs tht the head 4 and the first and second pressure rollers 26 and 27 are caused to separate from the tape 1, and the positions of the switch 69 and idle gears 52 and 53 do not change. Therefore, the tape 1 is transported to the same direction as in FIG. 2, but the loads due to the first pressure roller 26 and the head 4 are removed. Thus the load on the second motor 13 is mitigated, and the rotational speed of the second motor which has been operating along the line C-D in FIG. 2 is automatically increased to a speed along line $N_2$-B, whereby the tape 1 is wound by the first reel drive means 8 at a high speed.

When the direction of the fast winding is changed from that in FIG. 4, the direction control plate 37 is actuated, and the switch 69 as well as meshing engagement of the idle gears 52 and 53 are switches. Thus, the control states of the first and second motors are switched with respect to each other, whereby the first motor 12 rotates at a high speed for fast winding the tape 1 in the direction opposite to that of FIG. 4.

When the apparatus is actuated to change the state of FIG. 4 back to the state of FIG. 2, the head carriage 3 is actuated, whereby the tape 1 is brought to the tape playing mode by an operation the reverse of that whn changing from the state of FIG. 2 is brought to the state of FIG. 4. It is apparent that both the head carriage 3 and the direction control plate 37 are actuated at the same time if the states of FIG. 4 and FIG. 3 are reversed.

As evident from the above descriptions, the first and second motors used in the apparatus of the above embodiment have motor structures which contribute to smooth rotation. In addition, because of the operations of the first and second speed detecting means 117 and 118 and the first and second speed control circuit means 203 and 204, the rotational speeds of the motors are highly stable. Therefore, the motors can transport the tape at a very stable speed when they are operated as a tape feeding motor, while they can wind the tape with very little ripples in the winding torque. Furthermore, switching between the tape transporting directions and the switching between the tape playing mode and the fast winding mode can be easily done by a simple operation. Moreover, since the stator plate 119 is common to both the first and second motors 12 and 13, the motor construction is simple, which is especially useful when the two motors are required to be closely positioned to each other.

As is apparent from the foregoing, the apparatus of the above embodiment is a bi-directional magnetic tape recording/reproducing apparatus having advantages not obtainable by prior art apparatus, but the present invention is not limited to the above embodiment but should be construed as being limited only by the following claims.

What is claimed is:

1. A magnetic tape recording and/or reproducting apparatus, comprising:
   a magnetic head;
   two tape winding reels;
   a first capstan and a first pressure roller opposed thereto, a second capstan and a second pressure roller opposed thereto, said pressure rollers being movable into contact with said capstans for transporting a magnetic tape;
   two fixed motor means, one being coaxial with and directly driving said first capstan and the other being coaxial with and directly driving said second capstan;
   tape direction control means connected to said pressure rollers for selectively bringing said first or second pressure roller into contact with said first or second capstan, respectively, for selectively driving said tape in one or the other direction; and
   transmission means to which said tape direction control means is connected for driving said tape winding reels under the control of said tape direction control means, said transmission means having means for transmitting the rotary motion of said motors and being selectively engagable with one of said two winding reels and one of said two motor means while being disengaged from said other motor means or with the other of said two winding reels and the other of said two motors while being disengaged from said one motor means, depending on the direction in which said tape is to be transported, whereby said magnetic tape is selectively transported in one or the other direction for recording and/or reproducing.

2. The apparatus as claimed in claim 1 in which said transmission means is movable between the engagement with said one motor means and said one winding reel and the engagement with said other motor means and said other winding reel, and said tape direction control means has a coupling means for coupling said transmission means with said tape direction control means and said coupling means is movable by said direction control means for displacing said transmission means and changing the engagement of said transmission means with said two motor means and said two tape winding reels in response to the movement of said coupling means.

3. An apparatus according to claim 1, wherein said transmission means comprises a plurality of idlers.

4. An apparatus according to claim 3, wherein said idlers are gears, and each of said two motor means and said two tape winding reels is provided with a gear means for meshing engagement with said idlers.

5. An apparatus according to claim 3, wherein said transmission means further comprises a mounting plate pivotally mounted on said apparatus and on which said respective idlers are rotatably mounted, and a pivot for pivotally mounting said mounting plate disposed in the plane of symmetry between said first capstan and said second capstan.

6. An apparatus according to claim 1, wherein said transmission means comprises means for selectively engaging said two motor means with appropriate ones of said two tape winding reels during the fast-winding mode as well as during the recording and/or reproducing mode.

7. A magnetic tape recording and/or reproducing apparatus, comprising:
  a magnetic head;
  two tape winding reels;
  a first capstan and a first pressure roller opposed thereto, a second capstan and a second pressure roller opposed thereto, said pressure rollers being movable into contact with said capstans for transporting a magnetic tape;
  two fixed motor means, one driving said first capstan and the other driving said second capstan, each of said two motor means having a rotor means including a rotor coaxial with and coupled to said capstan, and a magnet having at least one pair of magnetic poles and attached to said rotor; a stator means being for driving said rotor means and including a stator plate facing and spaced from said magnet, an armature coil assembly disposed between said magnet and said stator plate, and position detecting means facing said magnet for controlling the current of said armature coil assembly by detecting the relative position of said magnet and said armature coil assembly; speed detecting means connected to said position detecting means for detecting the rotational speed of said rotor from the detected positions thereof; speed control circuit means and connected to said speed detecting means and said armature coil assembly for controlling the current flowing through said armature coil assembly to control the rotational speed of said rotor means in response to the information from said speed detecting means;
  tape direction control means connected to said pressure rollers for selectively bringing said first or second pressure roller into contact with said first or second capstan, respectively for selectively driving said tape in one or the other direction; and
  transmission means to which said tape direction control means is connected for driving said tape winding reels under the control of said tape direction control means, said transmission means having means for transmitting the rotary motion of said motors and being selectively engageable with one of said two winding reels and one of said two motor means or with the other of said two winding reels and the other of said two motors, depending on the direction in which said tape is to be transported, whereby said magnetic tape is selectively transported in one or the other direction for recording and/or reproducing.

8. An apparatus according to claim 7 wherein said respective stator plates are unitarily constructed.

9. An apparatus according to claim 7, wherein said rotors are made of a soft magnetic material and are provided with peripherally spaced recesses in the peripherical surfaces thereof, said speed detecting means comprising at least one frequency generator means, each of said frequency generator means comprising two soft magnetic plates facing each other and disposed with the edges slightly spaced from the peripherical surface of said rotor and at least one of said edges having periodic recesses at the same pitch as that of said recesses on said rotor; a magnet disposed between said two plates for producing a magnetic circuit through said two plates, said rotor and said magnet; and at least one armature coil disposed where the flux in said magnetic circuit passes therethrough.

* * * * *